No. 761,188. PATENTED MAY 31, 1904.
T. B. ALDRICH.
PROCESS OF MAKING HALOGEN TERTIARY BUTYL ALCOHOL.
APPLICATION FILED AUG. 21, 1901.
NO MODEL.
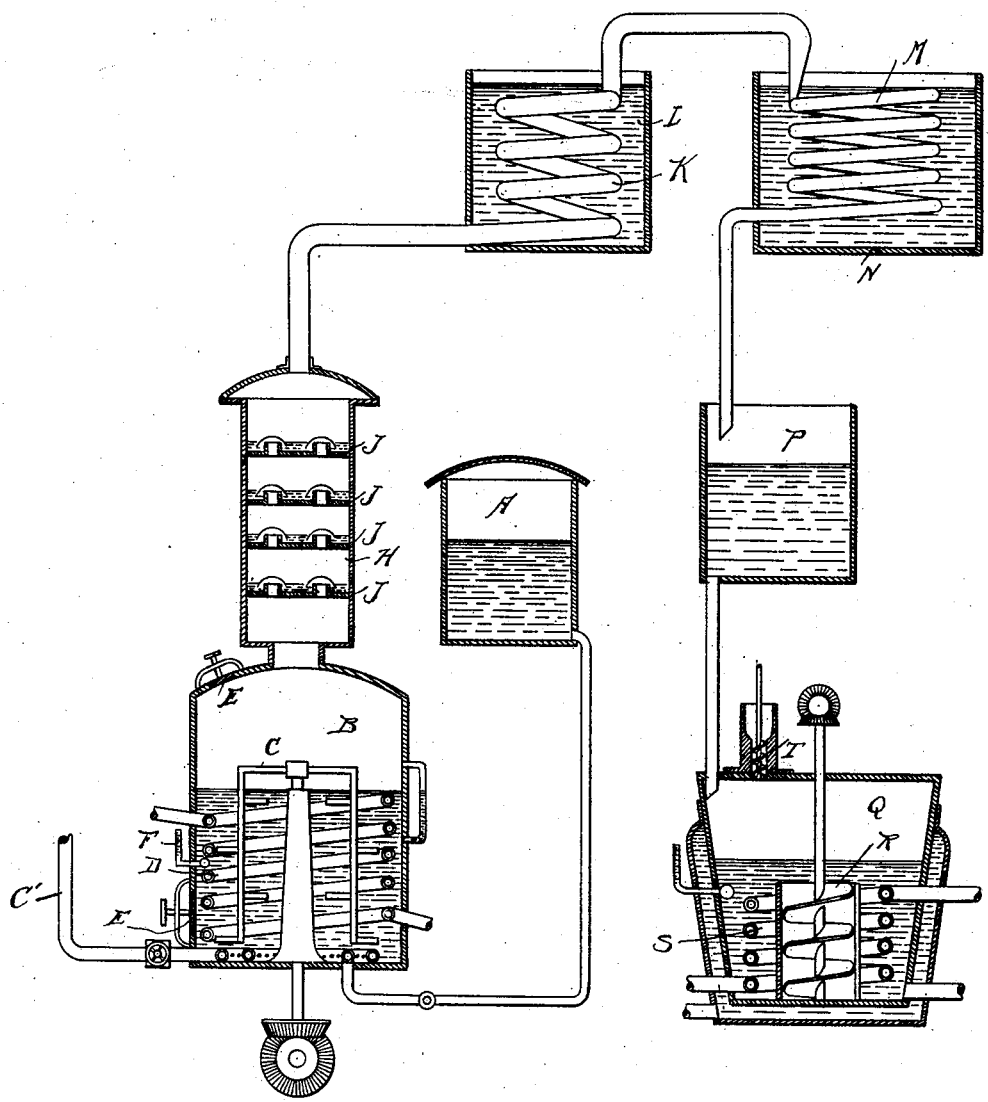
WITNESSES
INVENTOR No. 761,188. Patented May 31, 1904.

UNITED STATES PATENT OFFICE.

THOMAS B. ALDRICH, OF DETROIT, MICHIGAN.

PROCESS OF MAKING HALOGEN-TERTIARY-BUTYL ALCOHOL.

SPECIFICATION forming part of Letters Patent No. 761,188, dated May 31, 1904.

Application filed August 21, 1901. Serial No. 72,771. (No specimens.)

*To all whom it may concern:*

Be it known that I, THOMAS B. ALDRICH, a citizen of the United States, residing at Detroit, in the county of Wayne and State of Michigan, have invented certain new and useful Improvements in Processes of Manufacturing Halogen-Tertiary-Butyl Alcohol, of which the following is a specification, reference being had therein to the accompanying drawings.

The invention relates to the art of producing halogen-tertiary-butyl alcohols. Of the various compounds included in this class that best known is tri-chlor-tertiary-butyl alcohol, also known as acetone chloroform, tri-chlor tri-methyl carbinol, tri-chlorid of acetonic acid, and tri-chlorid of oxyisobutyric acid.

The invention consists in an improved process which may be specifically employed for the production of the above-named compound and which is generically applicable to the production of other compounds included in the class of halogen-tertiary-butyl alcohols.

Heretofore tri-chlor-tertiary-butyl alcohol has been manufactured from acetone and chloroform in the following manner: To a mixture of exactly equal parts of acetone and chloroform powdered caustic alkali is gradually added until the amount so introduced equals about ten per cent. of the original mixture. The resulting mixture is then separated from the chlorid of the alkalies, after which the excess of acetone and chloroform is distilled off and the residue is distilled with steam. The tri-chlor-tertiary-butyl alcohol which passes off with the steam condenses in crystalline form and may be purified by redistillation or recrystallization.

It is one of the objects of the present invention to reduce the cost or manufacture by the employment of less expensive materials than heretofore used.

The essential novelty of the invention therefore consists, first, in dispensing with the use of chloroform as one of the primary materials and in obtaining the necessary halogen substitution products by the treatment of ketones; second, in the modified process in which the ketones are first obtained by the treatment of other materials.

In the accompanying drawing I have shown in sectional elevation a simple form of apparatus for carrying out my invention.

In the simpler process acetone (or some other ketone) is used as the principal primary material, and the process is carried out in the following manner: The acetone is first partially halogenated, so as to produe a mixture of halogen substitution products and free ketones. This may be accomplished where chlorin substitution products are to be obtained by placing a mixture of calcium hypochlorite (or some other hypochlorite) and water in a tank and in then introducing the acetone gradually into the bottom of said tank. The mixture is preferably kept in constant agitation by means of a suitable mechanical stirrer or agitator, so as to produce a thorough mixing of the acetone and the hypochlorite. In place of the hypochlorite free chlorin gas may be used, in which case milk of lime or some other suitable agent is placed in a vessel and the acetone and chlorin gas introduced therein. The temperature of the mixture is so regulated that the acetone and chlorin substitution products will pass off in the form of vapor—for example, with tri-chlor-methane the temperature may be substantially 61° centigrade. The introduction of the acetone in the chlorinating-tank is also so regulated as to obtain a mixture of about one molecule each of the chlorin substitution products, of which chloroform is the principal one, and acetone. The mixed product thus obtained is then dehydrated in any suitable manner—as, for instance, by the use of a rectifying-column on the top of the chlorinating-tank, in which the aqueous vapor is condensed. The next step in the process consists in chemically uniting the mixed acetone and chlorin substitution products. This is accomplished by the use of a condensing agent—such as caustic alkali, heretofore used, barium hydrate, sodium peroxid, soda-lime, or any other agent capable of effecting a molecular union of the ketones and chlorin substitution products. The treatment of the mixture by the condensing agent may, if desired, be effected by mixing in the latter in powdered form or by some other means. The amount so introduced is regulated to obtain the greatest yield of product with a minimum formation of by-products. After the end of the reaction the liquid is transferred to a still and the excess of chloroform and acetone is driven off. The residue is then separated from the solid deposit of chlorids of the alkali. The remainder consists of the tri-chlor-tertiary-butyl alcohol and is in the form of an oily liquid when hot. It is next either subjected to fractional distillation or distilled over with steam and condensed in a crystalline form. The product thus obtained may be further purified by redistillation or recrystallization.

In order to further reduce the cost of manufacture, the process as above described may be modified by including a step in which the ketones are obtained from a cheaper material. The essential feature of this step resides in the employment of salts of the monobasic fatty acids as the primary material and in subjecting the same to dry distillation. For the production of the tri-chlor-tertiary-butyl alcohol I preferably employ an acetate—such, for instance, as calcium acetate—which when subjected to dry distillation will yield ketone bodies. If the vapor from the still is introduced directly into the chlorinating-tank, the ketone bodies will be partially chlorinated, and the process may then be carried out in the manner before described.

From the general description of my improved process as above given it will be understood that various products may be obtained by slight changes in detail. Thus the product tri-brom-tertiary-butyl alcohol may be obtained by brominating the ketones to form bromin substitution products in place of the chlorin substitution products. In like manner the other elements of the halogen group may be employed to form analogous compounds.

A more detail description of my process as it has been employed by me for the manufacture of tri-chlor-tertiary-butyl alcohol is as follows: The acetone or an aqueous solution of the same is conducted slowly or at intervals into the bottom of a vessel containing calcium hypochlorite (or some other hypochlorite) mixed with water, said vessel having a suitable mechanism for agitating the contents of same for the purpose of more thoroughly mixing the acetone with the hypochlorite solution. Instead of hypochlorite chlorin gas may be used as chlorinating agent. In such case milk of lime is placed in the vessel in place of hypochlorites, and chlorin gas is conducted into it simultaneously with the acetone. Said vessel is supplied with coils which can be used both for cold water as well as for steam or hot water. The addition of acetone is arranged in such a manner as to secure a yield of chlorin substitution products of methane and free acetone in such proportion that their vapors when properly condensed form the mixture of about one molecule of each of the chlorin substitution product and of acetone. The proportion suitable for this purpose is about one part of acetone to five parts of chlorid of lime at thirty-three per cent. of available chlorin or proportionately more if a weaker grade is employed, and the proportion of acetone to chlorin gas is about one part of the former to two parts of the latter. The temperature of the contents is regulated by the flow of acetone. If it cannot, however, be controlled in this manner, a cold-water coil may be used; but it is maintained at a temperature sufficiently high to drive off the vapors of chlorin substitution product of methane and some free acetone, for instance, at substantially 61° centigrade, as in the above-mentioned proportion. The vessel is provided with a rectifying-column and a condenser at the top, which is kept at such temperature as will condense the aqueous vapor, yet keeps the vapors of acetone and the chlorin substitution product in the form of vapor. The column and the condenser are so arranged that the vapors condensed will flow back to the original vessel. The vapors of acetone and its chlorin substitution products is conducted into a cooling-worm and then condensed and conducted into a vessel, where it is treated with caustic alkali. The product from the cooling-worm contains about one molecule of each of acetone and chlorin substitution product, which proportion can be attained by regulating the flow of acetone into the first vessel containing hypochlorites. To this mixture powdered caustic alkali is slowly added in about the proportion of twelve to twenty per cent. of the mixture, care being taken to keep the mass at the temperature where the greatest yield of the tri-chlor-tertiary-butyl alcohol can be obtained, preferably below 10° centigrade. After the end of the reaction the liquid is separated from the deposit in the still. The residue, consisting of the tri-chlor-tertiary-butyl alcohol in an oily form, when hot is now either subjected to a fractional distillation or distilled over with steam. The tri-chlor-tertiary-butyl alcohol thus obtained may be further purified by redistillation or recrystallization.

The vessel A serves as a reservoir for the acetone, which is connected by a pipe supplied with valves with the vessel B, where the acetone is partly chlorinated. The vessel B is supplied with stirrer C, pipe for chlorin gas C', coil of pipe D, which is connected with cold and hot water supply, manholes E E, thermometer F, and gage G, and other necessary fixings. The vessel B is connected at its top with a rectifying-column H, which consists of different sections J J J J, where the vapors of acetone and its chlorin substitution product are concentrated and where the aqueous vapor is partly condensed. The rectifier is connected to a coil K, contained in the vessel L, where the coil is kept at such a temperature that the vapors of acetone and chlorin substitution products will pass off to the next vessel, which the aqueous vapor will condense, and be carried back to the original vessel B. The coil K is connected to the coil M, contained in a vessel N, filled with cold liquid. The vapors so condensed are conducted into vessel P, where the product may be dehydrated, if necessary. From this vessel the liquid is conducted into vessel Q, where it is mixed with the proper proportion of caustic alkali, so as to form tri-chlor-tertiary-butyl alcohol. The vessel Q is provided with stirrer R, coil s, and caustic container T, and other necessary fixtures, such as the thermometer, gage, &c.

What I claim as my invention is—

1. The process of making halogen-tertiary-butyl alcohols which consists in treating a ketone with a halogenating agent so as to produce a mixture of free ketones and halogen substitution products and in then treating the resulting product with a condensing agent capable of producing a molecular union between the free ketones and the halogen substitution products.

2. The process of making halogen-tertiary-butyl alcohol which consists in treating a ketone with a halogenating agent so as to produce a mixture of free ketones and halogen substitution products, and then dehydrating the mixture without separation of said products, and in treating the dehydrated mixture with a condensing agent capable of producing a molecular union between the free ketones and halogen substitution products.

3. The process of making halogen-tertiary-butyl alcohols which consists in treating ketones with a halogen in the presence of a base to produce a mixture of free ketones and halogen substitution products, and in treating the resulting product with a condensing agent capable of producing a molecular union between said free ketones and halogen substitution products.

4. The process of making halogen-tertiary-butyl alcohols, which consists in subjecting to dry distillation, salts of the monobasic fatty acids, so as to produce ketones and without separation halogenating said ketones to produce a mixture of free ketones and halogen substitution products and in finally treating said mixture with a condensing agent capable of causing a molecular union between said ketones and the halogen substitution products.

5. The art of making tri-chlor-tertiary-butyl alcohol, which consists in treating acetone with hypochlorites, so as to chlorinate about one-half of the acetone employed, and treating the resulting product with caustic alkali, so as to form tri-chlor-tertiary-butyl alcohol, substantially as herein described.

6. The art of making tri-chlor-tertiary-butyl alcohol, which consists in adding acetone slowly to a mixture of chlorid of lime and water in such a manner that the product of the reaction will approximately consist of one molecule of each of chlorinated bodies and acetone, and treating this resulting product with caustic alkali, so as to form tri-chlor-tertiary-butyl alcohol, substantially as herein described.

In testimony whereof I affix my signature in presence of two witnesses.

THOMAS B. ALDRICH.

Witnesses:
M. B. O'Dogherty,
H. C. Smith.